United States Patent
Shim et al.

(10) Patent No.: US 9,936,563 B2
(45) Date of Patent: Apr. 3, 2018

(54) STRETCHABLE DISPLAY DEVICE

(71) Applicant: SAMSUNG DISPLAY CO., LTD., Yongin-si, Gyeonggi-do (KR)

(72) Inventors: Hong Shik Shim, Yongin-si (KR); Young Chan Kim, Yongin-si (KR); Hae Yun Choi, Yongin-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 15/388,858

(22) Filed: Dec. 22, 2016

(65) Prior Publication Data

US 2017/0105264 A1      Apr. 13, 2017

Related U.S. Application Data

(63) Continuation of application No. 14/862,176, filed on Sep. 23, 2015, now Pat. No. 9,532,430.

(30) Foreign Application Priority Data

Jan. 9, 2015   (KR) .................. 10-2015-0003528

(51) Int. Cl.
  *H01J 1/62*   (2006.01)
  *H05B 33/22*  (2006.01)
  *H05B 33/14*  (2006.01)
  *G02B 26/08*  (2006.01)

(52) U.S. Cl.
  CPC ......... *H05B 33/22* (2013.01); *G02B 26/0825* (2013.01); *H05B 33/14* (2013.01)

(58) Field of Classification Search
  CPC ..... H05B 33/22; H05B 33/14; G02B 26/0825
  USPC ........................................ 313/504, 506, 512
  See application file for complete search history.

(56) References Cited

U.S. PATENT DOCUMENTS

| 5,834,893 A | 11/1998 | Bulovic et al. |
| 7,521,292 B2 | 4/2009 | Rogers et al. |
| 2006/0286785 A1 | 12/2006 | Rogers et al. |

FOREIGN PATENT DOCUMENTS

| JP | 2-077725 A | 3/1990 |
| KR | 10-0854619 B1 | 8/2008 |
| KR | 10-2014-0030842 A | 3/2014 |

OTHER PUBLICATIONS

Hong, et al., "How to Stretch A Display and Maintain Pixel Resolution" SPIE, 2014.

*Primary Examiner* — Vip Patel
(74) *Attorney, Agent, or Firm* — Lee & Morse, P.C.

(57) ABSTRACT

A stretchable display device includes: a stretchable substrate; a plurality of light emitting units on the stretchable substrate; and a plurality of reflective mirrors positioned to correspond to the light emitting units, respectively, and reflecting light emitted from the light emitting units, respectively.

14 Claims, 7 Drawing Sheets

STRETCHABLE DISPLAY DEVICE

CROSS-REFERENCE TO RELATED APPLICATIONS

This is a continuation application based on pending application Ser. No. 14/862,176 filed Sep. 23, 2015, the entire contents of which is hereby incorporated by reference.

Korean Patent Application No. 10-2015-0003528, filed on Jan. 9, 2015, in the Korean Intellectual Property Office, and entitled: "Stretchable Display Device," is incorporated by reference herein in its entirety.

BACKGROUND

1. Field

Embodiments are directed to a stretchable display device. More particularly, the embodiments relate to a stretchable display device that can be stretched.

2. Description of the Related Art

In general, a stretchable display device is a display device with a variable image display area that changes, if necessary. A stretchable display device may use a stretchable substrate made of a polymer and an organic light emitting element for displaying an image on the substrate.

SUMMARY

One or more embodiments is directed to a stretchable display device that includes: a stretchable substrate; a plurality of light emitting units on the stretchable substrate; and a plurality of reflective mirrors positioned to correspond to the light emitting units, respectively, and reflecting light emitted from the light emitting units, respectively.

The reflective mirrors may be stretchable, respectively.

The reflective mirrors may respectively stretch in proportion to the degree of stretching of the stretchable substrate.

The reflective mirrors may be disposed in the stretchable substrate.

The reflective mirrors may have curved reflective sides facing the light emitting units.

The curvature of the curved reflective sides of the reflective mirrors may increase in proportion to the degree of stretching of the stretchable substrate.

The reflective sides may be concave with respect to the light emitting units.

The reflective sides may be convex toward the light emitting units.

The light emitting units may be arranged in a matrix on the stretchable substrate and make an image, respectively, and the reflective mirrors may be arranged in a matrix on the stretchable substrate, respectively.

The light emitting units may include an organic light emitting element.

The reflective mirrors may be larger than the light emitting units.

The reflective mirrors may extend beyond the light emitting units in two directions orthogonal to a stacking direction of the light emitting units and the reflective mirrors even when unstretched.

The reflective mirrors may completely overlap the corresponding light emitting unit.

A vertex of the reflective mirrors may be centered with the corresponding light emitting unit.

The vertex is centered when the stretchable substrate is stretched and when the stretchable substrate is unstretched.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
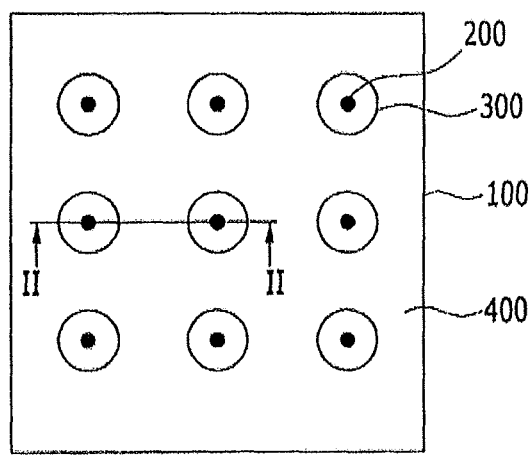
FIG. 1 illustrates a top plan view of a stretchable display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The parts not related to the description of the exemplary embodiments are not illustrated to make the description clear and like reference numerals designate like elements throughout the specification. Further, in the following exemplary embodiments, the components having the same configuration are designated by the same reference numerals and described in the first exemplary embodiment, and only other configurations different from the first exemplary embodiment are described in the other exemplary embodiments.

The size and thickness of the configurations are optionally illustrated in the drawings for the convenience of description and embodiments are not limited to the drawings.

In the drawings, the thicknesses of various layers and areas are exaggerated for clarity. Further, in the drawings, the thicknesses and sizes of some of layers and areas are exaggerated for the convenience of description. The case in which it is represented that each part such as a layer, a film, an area, a plate, or the like, is "on" another part is intended to include not only the case in which each part is "directly on", but also the case in which the other part is between each part and another part.

In addition, unless explicitly described to the contrary, the word "comprise" and variations such as "comprises" or "comprising", will be understood to imply the inclusion of stated elements but not the exclusion of any other elements. The term "on/above ~" used throughout the specification means "on/above or beneath/under" the object and it does not mean "vertically upward".

Hereinafter, a stretchable display device according to an exemplary embodiment will be described in detail with reference to FIGS. 1 to 4B.

Figure 2:
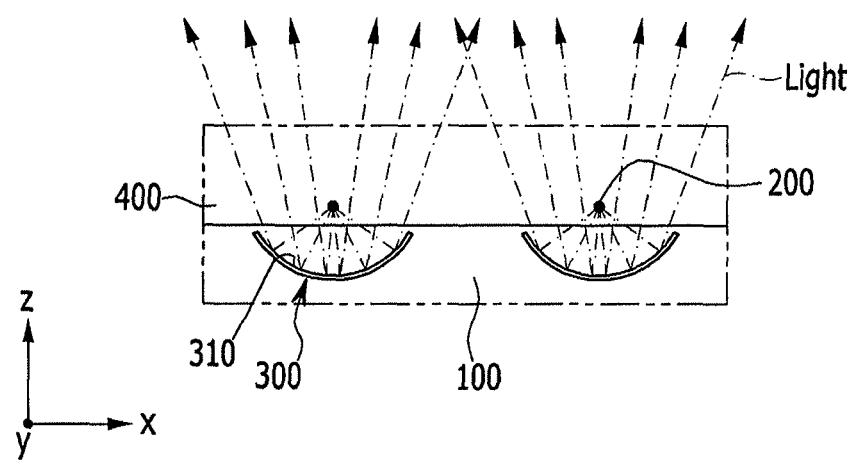
FIG. 2 illustrates a cross-sectional view taken along line II-II in FIG. 1.

FIG. 1 is a top plan view illustrating a stretchable display device according to an exemplary embodiment. FIG. 2 is a cross-sectional view taken along line II-II in FIG. 1.

As illustrated in FIGS. 1 and 2, a stretchable display device according to an exemplary embodiment includes a stretchable substrate 100, light emitting units 200, reflective mirrors 300, and a sealing unit 400.

The stretchable substrate 100 may be an insulating substrate including a polymer. The stretchable substrate 100 is stretchable. As used herein, stretchable is to include flexible, foldable, bendable, or rollable. As the stretchable substrate 100 is stretchable, the entire stretchable display device can be stretchable. The stretchable substrate 100 may include a driving unit connected with the light emitting units 200 and activates the light emitting units 200. The driving unit may include one or more scan wirings, one or more data wirings, a plurality of thin film transistor, and one or more capacitors, and those components may have various structures known in the art.

The light emitting units 200 are on or in the stretchable substrate 100 and sealed by the sealing unit 400 and the stretchable substrate 100. The light emitting units 200 are arranged in a matrix on the stretchable substrate 100 respectively and make images. The light emitting units 200 may be pixels that are the minimum units for making images, respectively, so the light emitting units 200 that are pixels can make images. The light emitting units 200 may include an organic light emitting element (OLED). The organic light emitting element includes anodes facing each other and an organic emission layer disposed between the anodes. The organic light emitting element can emit light in one or more directions of upward, downward, left, and right directions. At least one of the anodes of the organic light emitting element may be at least any one of an optical reflective electrode, an optical translucent electrode, and an optical transparent electrode. The organic emission layer of the organic light emitting element may be made of a low-molecular organic material or a high-molecular organic material such as PEDOT (Poly 3,4-ethylenedioxythiophene), The organic emission layer may include a red organic emission layer emitting red light, a green organic light emission layer emitting green light, and a blue organic light emission layer emitting blue light, and the red organic emission layer, the green organic light emission layer, and the blue organic light emission layer are disposed in a red pixel, a green pixel, and a blue pixel, respectively, and make a color image. The organic emission layer may form a color image by stacking all of the red organic emission layer, the green organic light emission layer, and the blue organic light emission layer in a red pixel, a green pixel, and a blue pixel and forming a red color filter, a green color filter, and a blue color filter for the pixels. As another example, the organic emission layer may form a color image by using a white organic emission layer emitting white light in all of a red pixel, a green pixel, and a blue pixel and forming a red color filter, a green color filter, and a blue color filter for the pixels, respectively. When an organic emission layer makes an color image using a white organic emission layer and color filters, there is no need for using a deposition mask for depositing a red organic emission layer, a green emission layer, and a blue emission layer on corresponding pixels, i.e., a red pixel, a green pixel, and a blue pixel, respectively. The white organic emission layer for an organic emission layer, which was described as another example, may be one organic emission layer and includes a configuration composed of a plurality of organic emission layers stacked to emit white light. For example, the organic emission layer may include a configuration in which at least one yellow organic emission layer and at least one blue emission layer are combined to emit white light, a configuration in which at least one cyan organic emission layer, and at least one red organic emission layer are combined to emit white light, and a configuration in which at least one magenta organic emission layer and at least one green organic emission layer are combined to emit white light.

While the light emitting unit 200 has been described as having an organic light emitting element, embodiments are not limited thereto, e.g., may include at least any one of an LED (Light Emitting Diode) and an LD (Laser Diode). The light emitting unit 200 may be an optical reflective display unit using external light.

The reflective mirrors 300 are disposed to correspond to the light emitting units 200, respectively. The reflective mirrors 300 reflect light from corresponding light emitting units 200, respectively. Light reflecting from the reflective mirrors travels back toward the light emitting units 200, thereby making an image. The reflective mirrors 300 disposed to correspond to the light emitting units 200, respectively, are arranged in a matrix on the stretchable substrate 100. The reflective mirrors 300 are larger in area than the corresponding light emitting units 200, respectively. For example, the reflective mirrors 300 may overlap and may extend beyond the corresponding light emitting unit 200 in the x and y directions, even when the stretchable substrate 100 is not stretched. Accordingly, the light from the light emitting units 200 reflects out at a large exit angle from the reflective mirrors 300.

The reflective mirrors 300 are stretchable and disposed in the stretchable substrate 100, respectively. Since the reflective mirrors 300 are stretchable, when the stretchable substrate 100 stretches or retracts, the reflective mirrors 300 stretch and retract with the stretchable substrate 100. The degrees of stretching and retracting of the reflective mirrors 300 correspond to the degrees of stretching and retracting of the stretchable substrate 100, respectively. The reflective mirrors 300 have curved reflective sides 310 facing the light emitting units 200 and the curvature of the reflective sides 310 increases in proportion to the degree of stretching of the stretchable substrate 100. The reflective sides 310 of the reflective mirrors 300 are concave with respect to the light emitting units 200, so that the light from the light emitting units 200 reflects from the reflective mirrors 300 and travels to a wide area.

The reflective mirrors 300 have one or more optical reflective layers and the optical reflective layer may include at least one of metal, an organic material, and an inorganic material. The reflective mirror 300 may reflect only light with specific wavelengths.

Although the reflective mirrors 300 are described as in the stretchable substrate 100 in an exemplary embodiment, alternatively, they may be on the stretchable substrate 100.

Although the light emitting units 200 and the reflective mirrors 300 are respectively arranged in a matrix the an exemplary embodiment, embodiments are not limited thereto, e.g., may be arranged in various shapes such as a circle, an ellipse, a closed loop, a triangle, a rectangle, a pentagon, a hexagon, a heptagon, an octagon, and other polygons, as long as they generate images.

The sealing unit 400 is on the stretchable substrate 100 with the light emitting units 200 therebetween. The sealing unit 400 is disposed over the stretchable substrate 100, i.e., completely overlaps the stretchable substrate 100 and, together with the stretchable 100, seals the light emitting units 200 in cooperation. The sealing unit 400 may include a polymer and be stretchable. As the sealing unit 400 and the stretchable substrate 100 are stretchable, the entire stretchable display device can be stretchable. The sealing unit 400 may have a touch unit recognizing touch and the touch unit may be disposed on or in the sealing unit 400. The touch unit of the sealing unit 400 may have various structures known in the art. The sealing unit 400 may include one or more organic layers and one or more inorganic layers, which are alternately stacked, and in detail, a plurality of inorganic layers or a plurality of organic layers may be provided and they may be alternately stacked, respectively. For example, the sealing unit 400 may include at least one sandwich structure formed by inserting at least one organic layer in between at least two inorganic layers.

Hereinafter, the effect of a stretchable display device according to an exemplary embodiment will be described in detail with reference to FIGS. 3A to 4B.

Figure 3A:
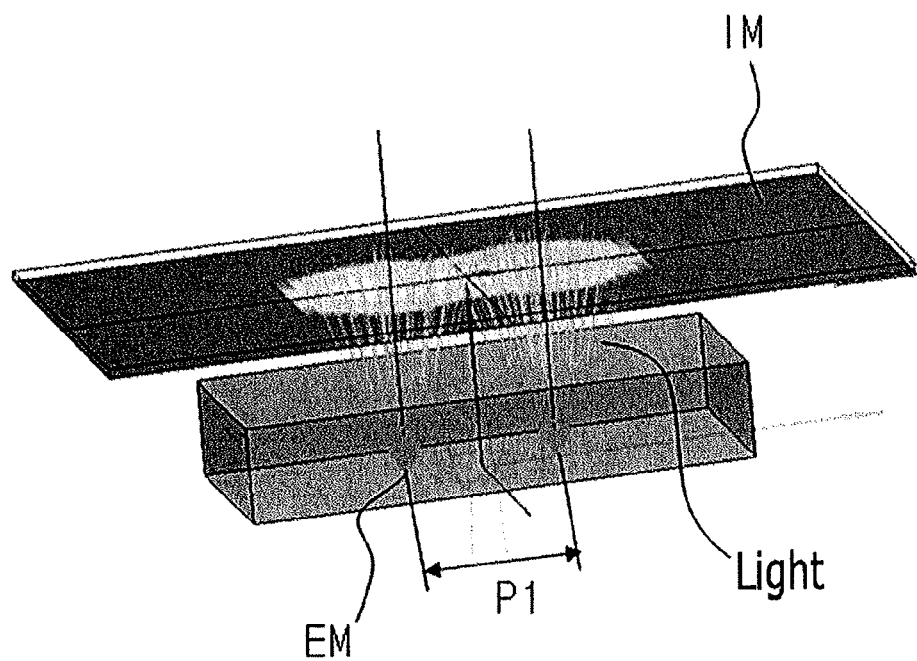
FIGS. 3A and 3B illustrate views of a related stretchable display device.
Figure 3B:
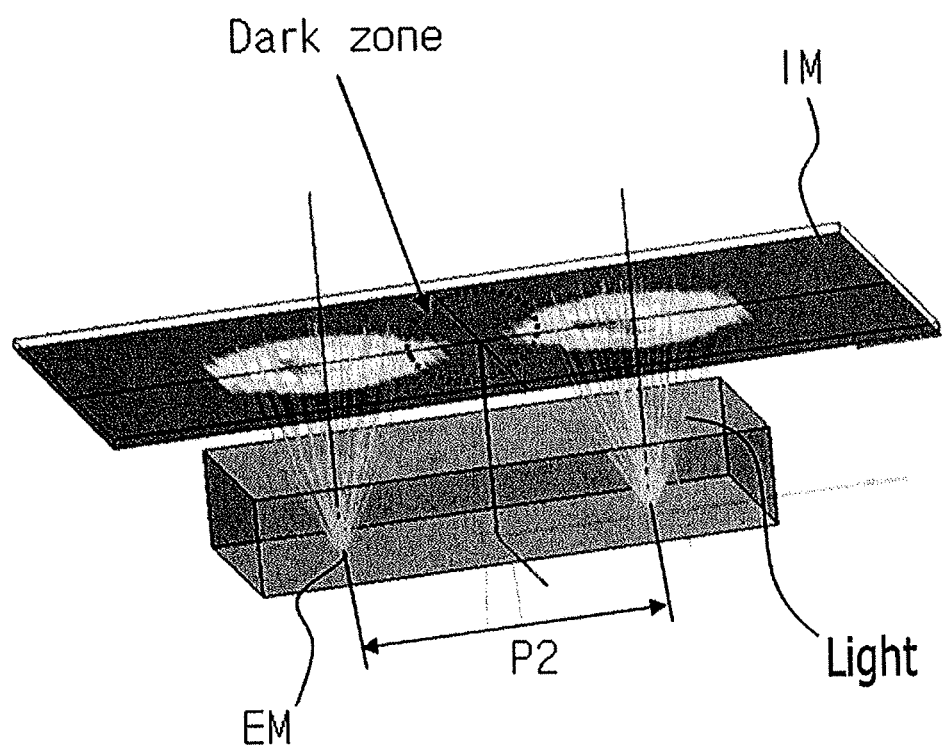

FIGS. 3A and 3B are views illustrating problems with a related stretchable display device. FIG. 3A illustrates a related stretchable display device which is not stretched yet and FIG. 3B illustrates the related stretchable display device that has been stretched.

As illustrated in FIG. 3A, in the related stretchable display device, the distance between adjacent light emitting units EMs is a first pitch P1, before it stretches. As illustrated in FIG. 3B, in the related stretchable display device, the distance between adjacent light emitting units EMs is a second pitch P2, after it stretches. The second pitch P2 is larger than the first pitch P1.

When the related stretchable display device stretches due to external force or by itself, the distance between adjacent light emitting units EMs increases from the first pitch P1 to the second pitch P2. Accordingly, the distances between the light emitting units EMs increase, respectively, dark zones are generated between pixels in an image IM made by the light emitting units EMs, and a user recognizes the dark zones. That is, when the related stretchable display device stretches, dark zones are generated between the light emitting units EMs, so the display quality of an image made by the light emitting units EMs decreases.

Figure 4A:
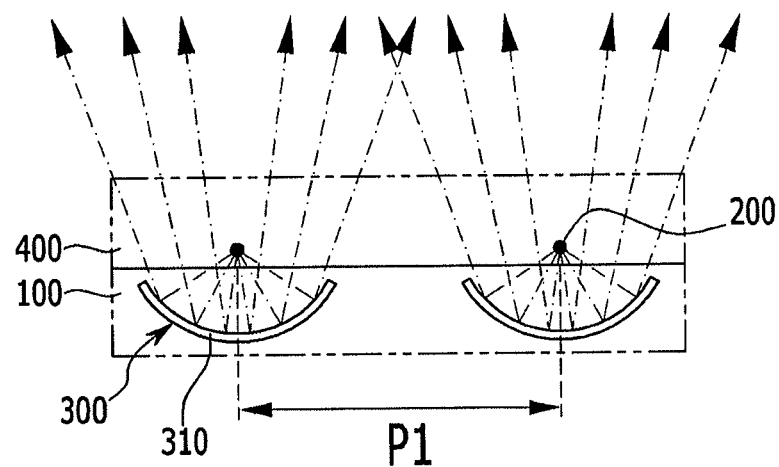
FIGS. 4A and 4B illustrate cross-sectional views of a stretchable display device according to an exemplary embodiment.
Figure 4B:
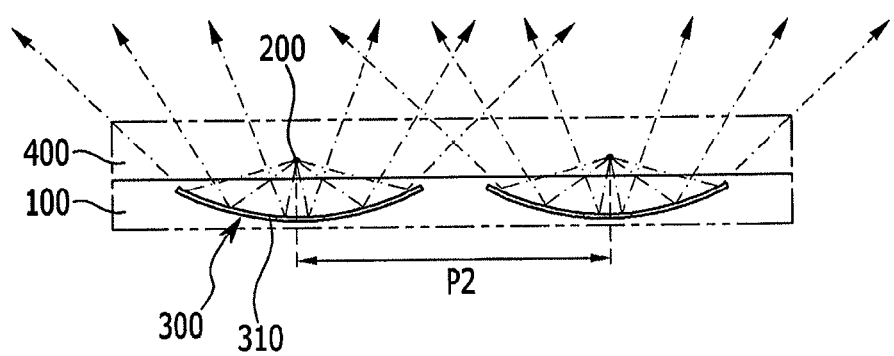

FIGS. 4A and 4B illustrate cross-sectional views of a stretchable display device according to an exemplary embodiment. FIG. 4A illustrates a cross-sectional view of a stretchable display device according to an exemplary embodiment before stretching and FIG. 4B illustrates a cross-sectional view of the stretchable display device according to an exemplary embodiment after stretching.

As illustrated in FIG. 4A, in the stretchable display device according to an exemplary embodiment, the distance between adjacent light emitting units EM is a first pitch P1, before it stretches. Reflective mirrors 300 are positioned, corresponding to the light emitting units 200, and have concave reflective sides 310. Further, as may be seen therein, a vertex of the reflective mirrors 300 may be centered on the corresponding light emitting unit 200, whether stretched or unstretched. Additionally, the reflective mirrors 300 may be symmetric about the vertex, whether stretched or unstretched.

As illustrated in FIG. 4B, in the stretchable display device according to an exemplary embodiment, the distance between adjacent light emitting units EM is a second pitch P2, after it stretches. The second pitch P2 is larger than the first pitch P1. The reflective mirrors 300 stretch in proportion to the degree of stretching of a stretchable substrate 100 of the stretchable display device. As the reflective mirrors 300 stretch, the curvature of the curved reflective sides 310 of the reflective mirrors 300 increases in proportion to the degree of stretching of the stretchable substrate 100.

As the reflective mirrors 300 stretch accordingly and the curvature of the reflective sides 310 increases accordingly, the exit angle of light reflecting from the reflective mirrors 300 after being emitted from the light emitting units 200 increases. Accordingly, even though the stretchable substrate 100 stretches and the second pitch P2 that is the distance between adjacent light emitting units 200 increases, the reflective mirrors 300 stretch in proportion to the degree of stretching of the stretchable substrate 100, the curvature of the reflective sides 310 of the reflective mirrors 300 increases, and the exit angle of the light reflecting from the reflective mirrors 300 after being emitted from the light emitting units 200 increases, such that a dark zone is prevented from being generated between adjacent light emitting units 200.

As described above, since a stretchable display device according to an exemplary embodiment includes the stretchable reflective mirrors 300 that stretch in proportion to the degree of stretching of the stretchable substrate 100, even though the stretchable substrate 100 stretches and the distances between the light emitting units 200 increase, the reflective mirrors 300 stretch in proportion to the degree of stretching of the stretchable substrate 100 and the curvature of the reflective sides 310 of the reflective mirrors 300 increases, such that the exit angle of the light reflecting from the reflective mirrors 300 after being emitted from the light emitting units 200 increases.

Accordingly, a dark zone between adjacent light emitting units 200 may be reduced or prevented. Thus embodiments provide a stretchable display device that can be stretched and can display an image made by the light emitting units 200 and having a minimized reduction of display quality.

Hereinafter, a stretchable display device according to another exemplary embodiment will be described in detail with reference to FIG. 5. Only the differences from the stretchable display device according to an exemplary embodiment described above are described below.

Figure 5:
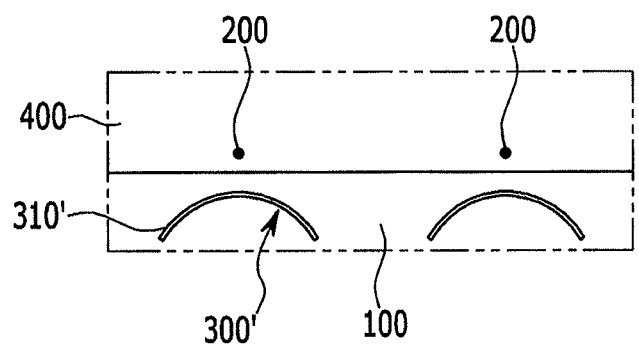
FIG. 5 illustrates a cross-sectional view of a stretchable display device according to another exemplary embodiment.

FIG. 5 illustrates a cross-sectional view of a stretchable display device according to another exemplary embodiment.

As illustrated in FIG. 5, a stretchable display device according to another exemplary embodiment includes a plurality of reflective mirrors 300', which are respectively positioned, corresponding to the plurality of light emitting units 200. The reflective mirrors 300' reflect light from corresponding light emitting units 200, respectively. Light reflected from the reflective mirrors 300 travels back toward the light emitting units 200, thereby forming an image. Since the reflective mirrors 300' correspond to the light emitting units 200, respectively, they are arranged in a matrix on the stretchable substrate 100.

The reflective mirrors 300' are respectively stretchable and disposed in the stretchable substrate 100. Since the reflective mirrors 300' are stretchable, when the stretchable substrate 100 stretches or retracts, the reflective mirrors 300 stretch and retract with the stretchable substrate 100. The degrees of stretching and retracting of the reflective mirrors 300 correspond to the degrees of stretching and retracting of the stretchable substrate 100, respectively. The reflective mirrors 300' have curved reflective sides 310' facing the light emitting units 200 and the curvature of the reflective sides 310' increases in proportion to the degree of stretching of the stretchable substrate 100. The reflective sides 310' of the reflective mirrors 300' are convex toward the light emitting units 200, so that the light from the light emitting units 200 reflects from the reflective mirrors 300 and travels to a wide area. Again, a vertex of the reflective mirror 300' may be centered on the corresponding light emitting unit 200 whether stretched or not, the reflective mirror 300' may overlap and extend beyond the light emitting unit 200 in the x and y directions, even when unstretched, and the reflective mirror 300' may be symmetric relative to the vertex whether stretched or not.

As described above, since a stretchable display device according to another exemplary embodiment of includes the stretchable reflective mirrors 300' that stretch in proportion to the degree of stretching of the stretchable substrate 100, even though the stretchable substrate 100 stretches and the distances between the light emitting units 200 increases, the reflective mirrors 300' stretch in proportion to the degree of stretching of the stretchable substrate 100 and the curvature of the reflective sides 310' of the reflective mirrors 300' increases, such that the exit angle of the light reflecting from the reflective mirrors 300' after being emitted from the light emitting units 200 increase.

Accordingly, a dark zone between adjacent light emitting units 200 may be reduced or prevent. Thus, an embodiment provides a stretchable display device that can be stretched and can display an image made by the light emitting units 200 and having a minimized reduction of display quality.

Embodiments provide a stretchable display device in which a decreased in display quality is minimized when the display device is stretched and a display area increases.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A stretchable display device, comprising:
 a stretchable substrate;
 a plurality of light emitting units on the stretchable substrate; and
 a plurality of reflective mirrors positioned to correspond to the light emitting units, respectively, and reflecting light emitted from the light emitting units, respectively,
 wherein a distance between centers of neighboring reflective mirrors of the plurality of reflective mirrors varies in accordance with whether the stretchable substrate is in a stretched state or an unstretched state.

2. The stretchable display device as claimed in claim 1, wherein a distance between centers of neighboring light emitting units of the plurality of light emitting units varies in accordance with whether the stretchable substrate is in a stretched state or an unstretched state.

3. The stretchable display device as claimed in claim 2, wherein the centers of neighboring reflective mirrors are coincident to the centers of neighboring light emitting units.

4. The stretchable display device as claimed in claim 1, wherein the reflective mirrors are in the stretchable substrate.

5. The stretchable display device as claimed in claim 1, wherein the reflective mirrors have curved reflective sides facing the light emitting units.

6. The stretchable display device as claimed in claim 5, wherein the reflective sides are concave with respect to the light emitting units.

7. The stretchable display device as claimed in claim 5, wherein the reflective sides are convex toward the light emitting units.

8. The stretchable display device as claimed in claim 1, wherein:
 the light emitting units are respectively arranged in a matrix on the stretchable substrate and make an image, and
 the reflective mirrors are respectively arranged in a matrix on the stretchable substrate.

9. The stretchable display device as claimed in claim 1, wherein the light emitting units include an organic light emitting element.

10. The stretchable display device as claimed in claim 1 1, wherein the reflective mirrors are larger than the light emitting units.

11. The stretchable display device as claimed in claim 10, wherein the reflective mirrors extend beyond the light emitting units in two directions orthogonal to a stacking direction of the light emitting units.

12. The stretchable display device as claimed in claim 1, wherein the reflective mirrors completely overlap the corresponding light emitting units.

13. The stretchable display device as claimed in claim 1, wherein the reflective mirrors are spaced apart from the light emitting units.

14. A stretchable display device, comprising:
 a stretchable substrate;
 a plurality of light emitting units on the stretchable substrate; and
 a plurality of reflective mirrors positioned to correspond to the light emitting units, respectively, and reflecting light emitted from the light emitting units, respectively,
 wherein a distance between vertexes of neighboring reflective mirrors of the plurality of reflective mirrors varies in accordance with whether the stretchable substrate is in a stretched state or an unstretched state.

* * * * *